United States Patent

Nuyken et al.

Patent Number: 5,232,780
Date of Patent: Aug. 3, 1993

[54] MICROCAPSULES WITH A POLYMERIC CAPSULE WALL

[75] Inventors: Oskar Nuyken, Munich; Brigitte Voit, Goldkronach/Brandholz; Jochen Dauth, Bayreuth, all of Fed. Rep. of Germany

[73] Assignee: Siemens Aktiengesellschaft, Munich, Fed. Rep. of Germany

[21] Appl. No.: 776,279

[22] Filed: Dec. 18, 1991

[30] Foreign Application Priority Data

May 31, 1989 [DE] Fed. Rep. of Germany ....... 3918141

[51] Int. Cl.⁵ ............................................. B01J 13/16
[52] U.S. Cl. .............................. 428/402.21; 252/606; 252/609; 264/4.3; 264/4.33; 264/4.7; 424/408; 424/462; 424/497; 424/501; 426/89; 430/138
[58] Field of Search ............... 430/138, 906; 424/408, 424/462, 497, 501

[56] References Cited

U.S. PATENT DOCUMENTS

| | | | |
|---|---|---|---|
| 3,301,439 | 1/1967 | Kosar et al. | 430/138 X |
| 3,318,697 | 5/1967 | Shrewsbury | 430/138 X |
| 3,429,827 | 2/1969 | Ruus | 264/4.7 |
| 4,356,108 | 10/1982 | Schwab et al. | 264/4.7 |
| 4,428,983 | 1/1984 | Nehen et al. | 264/4.7 X |
| 4,561,981 | 12/1985 | Characklis | 428/402.2 |
| 4,663,266 | 5/1987 | Adair et al. | 430/138 |
| 4,766,037 | 8/1988 | Watanabe et al. | 428/402.21 |
| 4,889,789 | 12/1989 | Stahlhofen | 430/906 X |
| 4,904,563 | 2/1990 | Aoai et al. | 430/138 |
| 4,965,166 | 10/1990 | Hosoi et al. | 430/138 X |

FOREIGN PATENT DOCUMENTS

| | | |
|---|---|---|
| 0165227 | 12/1985 | European Pat. Off. |
| 1542260 | 3/1970 | Fed. Rep. of Germany |
| 1091076 | 11/1967 | United Kingdom ................. 264/4.7 |
| 2173452A | 4/1986 | United Kingdom |

OTHER PUBLICATIONS

Article Mikroverkapselung Dr. W. Sliwka Angew. Chem. 87 1975 No. 16 pp. 556–567.
Chemical Abstracts, Band 96, Nr. 24, 14, Jun. 1982, JP, A, 56121628 (Mitsubishi Paper Mills Ltd) 24, Sep. 1981.

Primary Examiner—Richard D. Lovering
Attorney, Agent, or Firm—Hill, Steadman & Simpson

[57] ABSTRACT

In microcapsules with a polymeric capsule wall, the polymer of the capsule wall comprises thermolabile predetermined breaking points in the form of hexamethylenetetramine or acetaldehyde ammonia derivatives in order to facilitate release of the capsule contents (various active substances, such as example, dyes, medicaments, developers, curing agents, flameproofing agents) in a specific manner by exposure to heat.

2 Claims, No Drawings

MICROCAPSULES WITH A POLYMERIC CAPSULE WALL

BACKGROUND OF THE INVENTION

The invention relates to microcapsules with a polymeric capsule wall.

Microcapsules of this type, processes for their production and various possible uses are disclosed in "Angewandte Chemie", 1975, No. 16, pages 556 to 567. According to this publication, microcapsules are taken to mean particles having a size on the order of from 1 to 5000 microns which comprise a core and a solid capsule wall. According to the intended use of the microcapsules, the core contains an active substance which is insulated from the capsule environment by the capsule wall, and can be released to the environment in a specific manner by destruction of the capsule wall or by permeation. The capsule wall comprises, in particular, natural or synthetic polymers whose type, together with the thickness of the capsule wall, on the one hand, determines the outer shape of the microcapsules as spheres, botryoidal aggregates or irregular structures and, on the other hand, determines the ability of the capsule wall to insulate and liberate the capsule contents in a specific manner. The capsule opening can be effected mechanically from the outside, by shearing or crushing, or from the inside, for example by heating to above the boiling point of the capsule contents, by dissolution, melting or combustion of the capsule wall.

Known microencapsulation methods are mechanical-physical and chemical processes. The latter includes interface polycondensation, in which a first monomer, dissolved in a water-immiscible solvent, is dispersed in a water/protective colloid solution with vigorous stirring; when a second monomer dissolved in water is added, the two monomers react at the solvent/water interface to form a solid polymer (polycondensate) in the form of microcapsules containing the solvent.

A known use of microcapsules is in reaction copy papers, for example of the "self-contained type", which are coated on one side with microcapsules containing a color former and with a developer substance. At the points where the microcapsules are destroyed by the pressure of a writing implement, a visible mark immediately appears due to the color former which is developing.

A further use of microcapsules is disclosed in GB-A-2,173,452 in combination with an image-recording process in which the ink-containing microcapsules are applied to a recording carrier and are broken open, or at least rendered ink-permeable by a laser beam, so that the ink reaches the recording paper in accordance with the image to be recorded. There is no indication in GB-A-2,173,452 of how this is actually achieved and which capsule wall materials may be suitable for this purpose.

SUMMARY OF THE INVENTION

The present invention provides microcapsules with a thermolabile capsule wall which breaks open on exposure to heat.

This object is achieved according to the invention in that the capsule wall polymer comprises thermolabile predetermined breaking points and has the following structure wherein R1 is a cyclic or acyclic hydrocarbon.

A further embodiment of the microcapsules is illustrated below, wherein the capsule wall polymer of the microcapsule has the structure:

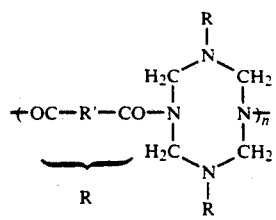

DETAILED DESCRIPTION OF THE PRESENTLY PREFERRED EMBODIMENTS

The microcapsules according to the invention have a crosslinked polymeric capsule wall having thermolabile predetermined breaking points at the network junctions, which can be borken in a specific manner, mainly by heat, in order to release the capsule contents. In addition, the microcapsules are simple and safe to handle since, as a consequence of the crosslinked capsule wall structure, they are capable of withstanding mechanical load and their capsule wall is impermeable to the capsule contents.

A further advantage is that the predetermined breaking points decompose exothermically and with release of propellant gas (inter alia nitrogen), the thermal energy required to initiate the decomposition is reduced due to the heat being liberated, and the liberation of the capsule contents is accelerated by the propellant gas. At the same time, the action of the propellant gas can additionally be supported by a low-boiling liquid contained in the capsules. The microcapsules according to the invention are therefore highly suitable for liberating active substances, such as dyes, color formers, medicaments, foodstuffs, pesticides, developers, curing agents, flameproofing agents, and many others, at the desired time by exposure to heat.

For the capsule wall polymers illustrated in Examples 1 and 2, decomposition temperatures of about 268° C. and about 140° C. respectively are achieved, so that there is no danger due to premature decomposition, for example at room temperature. In addition, the decomposition temperature can be adjusted within a relatively large range during formation of the capsule wall as a function of the starting monomers.

By way of example, and not limitation, the following examples serve to further illustrate the present invention.

EXAMPLE 1:

The following batches are prepared for microencapsulation of an active ingredient, for example the color former crystal violet lactone:

Solution (1): The active ingredient is dissolved in an organic solvent, for example toluene, with stirring, Solution (2): The monomeric starting material is a difunctional acid or acid derivative, for example terephthalic acid dichloride, dissolved in the abovementioned solvent toluence with stirring, Solution (3): Low-molecular-weight polyvinyl alcohol, which serves as a dispersion auxiliary and protective colloid, is dissolved in distilled water with stirring, Solution (4): The crosslinking agent component is hexamethylenetetraamine (urotropin) and NaOH dissolved in distilled water.

Solutions (1) and (2) are combined and dispersed in solution (3). Solution (4) is added slowly and with cooling to the emulsion obtained in this way at a high stirring speed (>1000 rpm). Due to interface polycondensation, microcapsules having a capsule content comprising toluene, crystal violet lactone and terephthaloyl dichloride and a capsule wall comprising the crosslinked polyamide below are obtained:

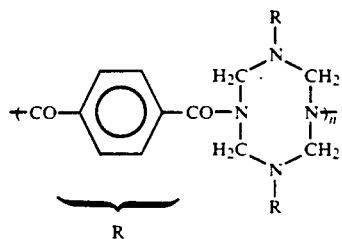

In order to complete the interface polycondensation, the microcapsule suspension is stirred further. The microcapsules obtained in this way are mechanically stable and can be broken open thermolytically at temperatures of about 268° C. in order to liberate the capsule contents.

EXAMPLE 2:

With acetaldehyde ammonia as the crosslinking agent component, microcapsules having a capsule wall comprising the crosslinked polyamide below are obtained:

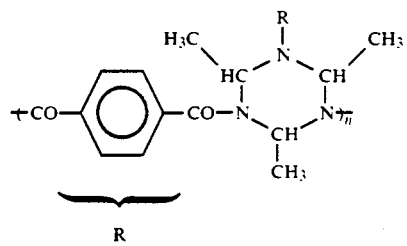

The microcapsules obtained are mechanically stable and can be broken open thermolytically at temperatures of about 140° C. to liberate the capsule contents.

It should be understood that various changes and modifications to the presently preferred embodiments described herein will be apparent to those skilled in the art. Such changes and modifications can be made without departing from the spirit and scope of the present invention and without diminishing its attendant advantages. It is, therefore, intended that such changes and modifications be covered by the appended claims.

We claim:

1. Microcapsules having a polymeric capsule wall the polymeric capsule wall includes thermolabile predetermined breaking points and has the following structure:

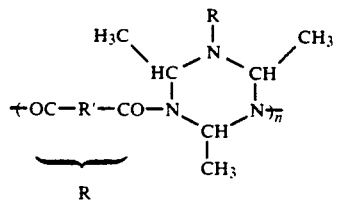

wherein $R^1$ is chosen from the group consisting of cyclic and acyclic hydrocarbons.

2. Microcapsules having a polymeric capsule wall the polymeric capsule wall includes thermolabile predetermined breaking points and has the following structure:

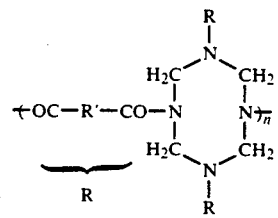

wherein $R^1$ is chosen from the group consisting of cyclic and acyclic hydrocarbons.

* * * * *